April 30, 1957 J. F. STEPHENS ET AL 2,790,464
INSULATED DUCT
Filed Feb. 13, 1953. 3 Sheets-Sheet 1
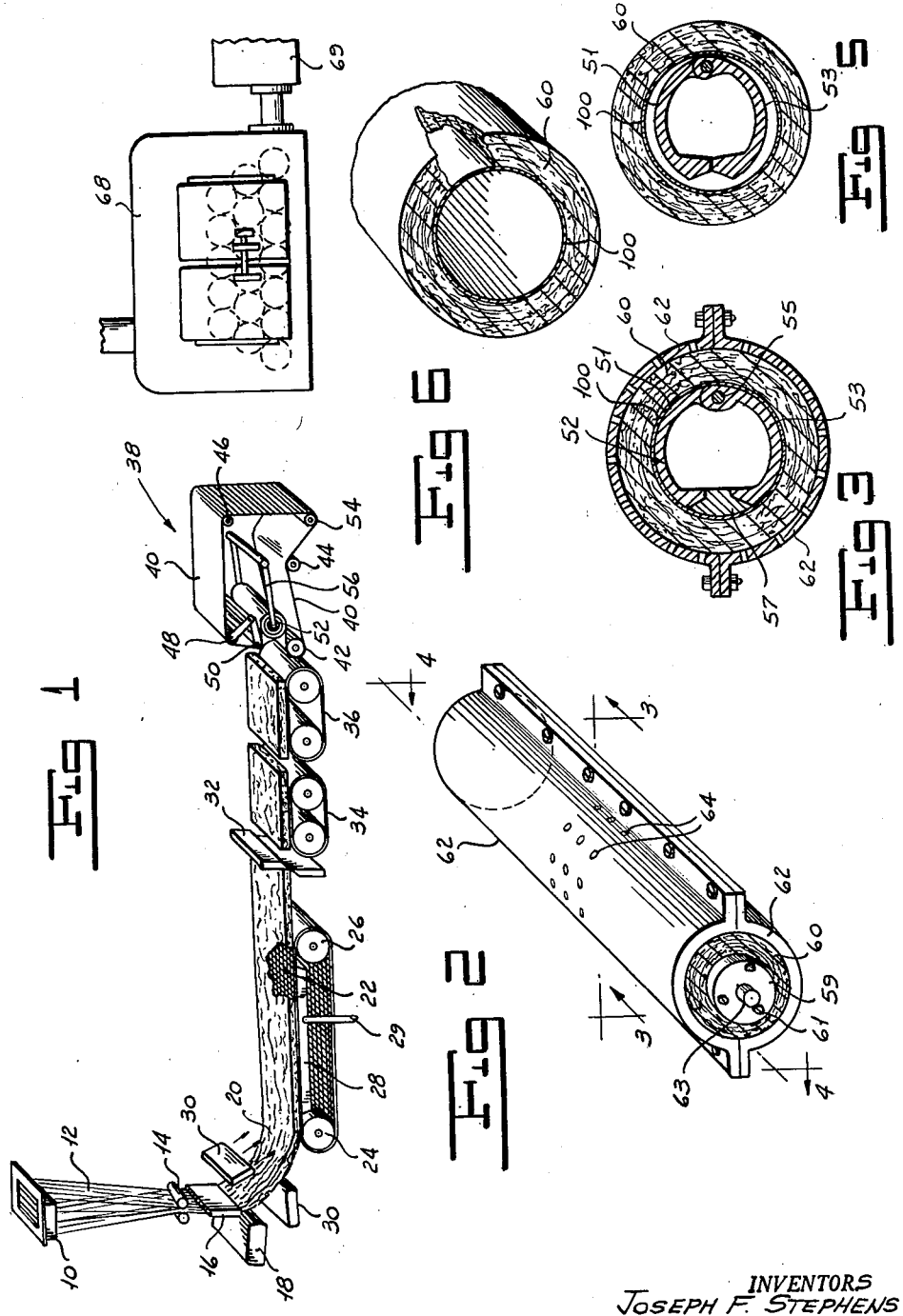
INVENTORS
JOSEPH F. STEPHENS
GLENN W. KERR
BY
ATTORNEY

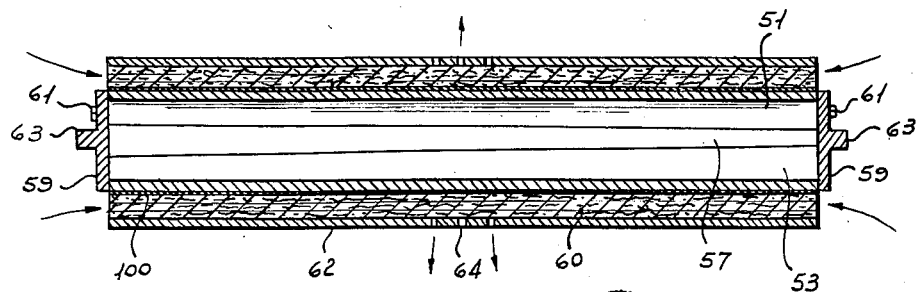
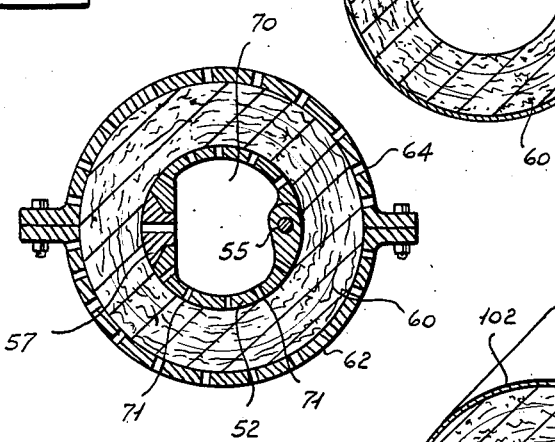
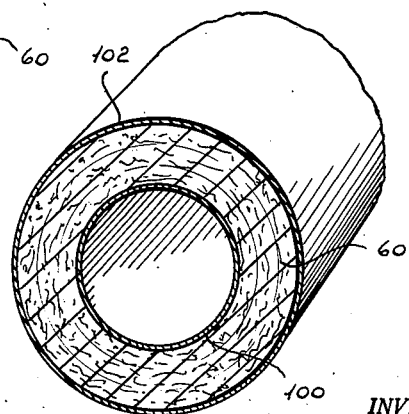

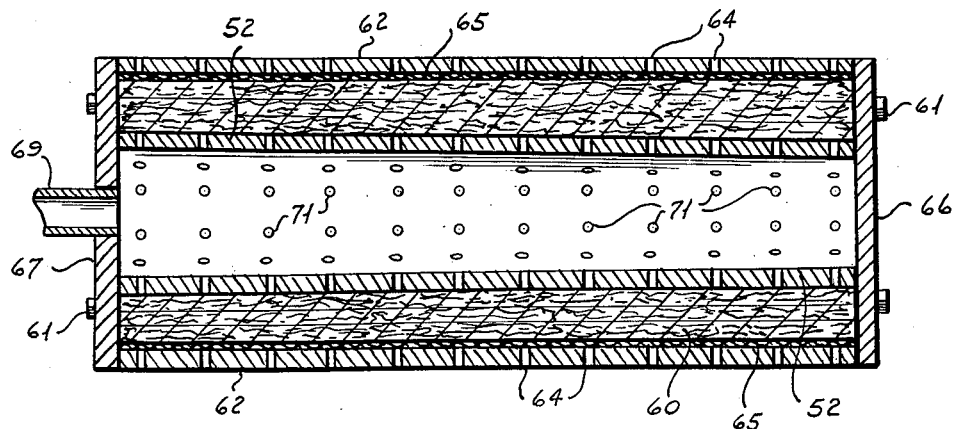
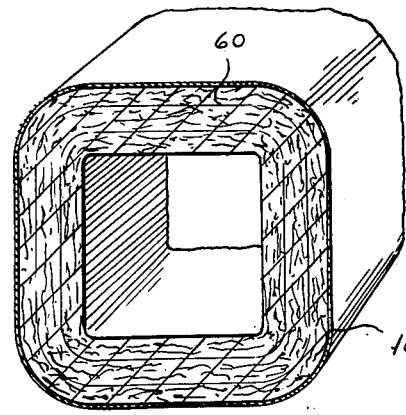
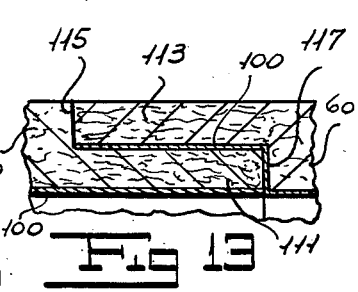
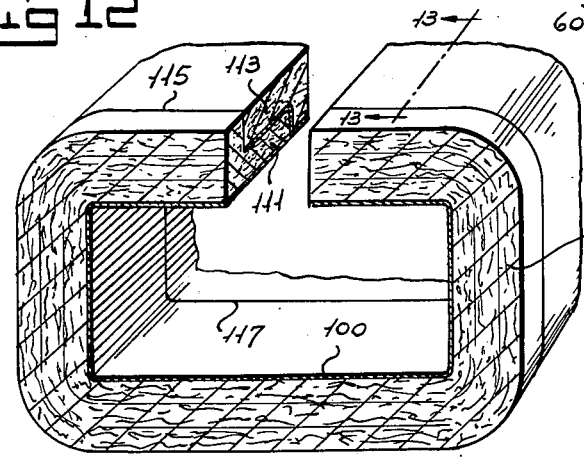
INVENTORS
JOSEPH F. STEPHENS
GLENN W. KERR
BY
ATTORNEY

United States Patent Office 2,790,464
Patented Apr. 30, 1957

2,790,464

INSULATED DUCT

Joseph F. Stephens, Kansas City, Mo., and Glenn W. Kerr, Mission, Kans., assignors to Gustin-Bacon Manufacturing Co., Kansas City, Mo., a corporation of Missouri Application February 13, 1953, Serial No. 336,712

12 Claims. (Cl. 138—76)

Our invention relates to an insulated duct and a method of making the same and more particularly to an insulated duct for use as a heat conduit for perimeter heating systems or as a duct for distributing heated or cooled air in hot-air heating systems or air-conditioning systems or both.

Insulated ducts of the prior art for conducting heated or cooled air in hot-air heating systems or in air-conditioning systems are customarily formed of sheet metal to which has been applied insulating material. The thermal resistivity of the insulating material used for this purpose has been comparatively low. Heating ducts for use in perimeter heating, for example, are frequently laid or buried in concrete floors. These ducts conduct hot air from a central source to the wall outlets positioned adjacent the walls or perimeter of the room to be heated. Unless the floor ducts are well insulated, hot streaks are formed in the floor and considerable heat loss experienced.

In our copending application, Serial No. 318,856, filed November 5, 1952, we have shown a thermal pipe insulation and a method of making the same. The pipe insulation shown in that application is adapted to be placed about a pipe to form a thermal insulated covering for the same. In order to enable this to be accomplished, the pipe covering was provided with an axially extending slit by means of which the pipe covering could be removed from the mandrel around which it was formed (and at the same time serve to enable the pipe covering to be placed about a pipe to be insulated).

We have discovered that the elasticity of our insulating material is such that an unslit cylinder of the material will retain its cross-sectional shape against external forces and thus enable the cylinder to act as a duct having remarkable insulating properties. Stated differently, we have discovered that we can form a duct in which the walls thereof are made of insulating material so that the insulation itself acts as the boundary material for the duct. The ducts thus constituted may be provided with an interior foil or film, an exterior foil or film, or both, if desired. Our insulated duct will have sufficient dimensional stability to enable it to be placed in trenches and be partially or wholly covered with wet concrete so that when the concrete sets, an insulated duct is provided in situ in the concrete material. The insulated ducts may, for example, be advantageously employed in perimeter heating applications to conduct the hot air from a central source to the walls or perimeter or a room without creating hot streaks or areas in the floor. For such use our insulated duct may be advantageously provided with an exterior film or foil to prevent the insulating duct material from becoming waterlogged from the surrounding wet concrete.

One object of our invention is to provide an insulated duct formed of a heat-insulating material having a very high resistance to heat flow in proportion to its weight.

Another object of our invention is to provide an insulated duct formed of a heat-insulating material having sufficient elasticity to retain its dimensional stability under considerable external force.

Another object of our invention is to provide an insulated duct formed of an insulating material in which the dimensional stability of the duct comes from the insulating material itself rather than from a sheet metal pipe or the like to which an insulating material has been applied.

A further object of our invention is to provide a heat-insulating duct formed of insulating material having an interior foil or film to provide for the smooth passage of heating or cooling air.

Another object of our invention is to provide an insulated duct formed of insulating material, having an exterior foil or film, of sufficient dimensional stability so that it may be buried in wet concrete to form insulated air passages therethrough for conducting heating or cooling air.

Other and further objects of our invention will appear from the following description.

In general, our invention contemplates the formation of an insulated duct from glass fibers bonded with a binder and molded to cylindrical or other cross-sectional form by heat in which the diameter of the glass fibers lies within predetermined limits, the weight of the binder with respect to the weight of the glass fibers is maintained within predetermined limits and in which we control the density of the insulating material during its molding to a predetermined range. With the proper limits, we are enabled to produce a material having a high thermal resistivity per pound of density and which is sufficiently elastic or springy so that it will retain its cross-sectional form if deformed by a sufficiently large force. This dimensional stability of our insulated duct, coupled with its high thermal resistivity, enables us to produce an insulated duct of vastly improved properties.

We also contemplate the provision of a lining of metal foil or film for the interior of our insulated duct to reduce the resistance to the flow of heating or cooling air in heating or air-conditioning systems and to prevent the loss of heated or cooled air through the interstices between the glass fibers of our insulating material. If the resistance to flow is not of major concern, we can render our duct impervious to the passage of heated or cooled air through the walls of the duct by coating the exterior of the duct with a film or foil impervious to air. To achieve both smoothness in flow and to provide a barrier against transverse flow of air through the insulating material which forms the duct we may, in addition to the interior lining of foil or film, provide an exterior covering of foil or film.

In the accompanying drawings which form part of the instant specification and which are to be read in conjunction therewith and in which like reference numerals are used to indicate like parts in the various views:

Figure 1 is a diagrammatic view of an apparatus capable of carrying out the process of our invention.

Figure 2 is a perspective view of an insulated duct according to our invention in position in a mold after having been rolled upon the mandrel.

Figure 3 is a sectional view drawn on an enlarged scale viewed along the line 3—3 of Figure 2.

Figure 4 is a longitudinal sectional view taken along the line 4—4 of Figure 2.

Figure 5 is a sectional view similar to Figure 3 showing the position of parts with the collapsible mandrel in collapsed position and after the molding step has been completed.

Figure 6 is a perspective view with parts in section and parts broken away showing an insulated duct containing one embodiment of our invention with an interior lining of foil or film.

Figure 7 is a sectional view drawn on an enlarged scale similar to Figure 3 showing another form of our invention in which no interior film or foil is employed during the process of manufacturing our insulated duct.

Figure 8 is a view similar to Figure 6 showing another embodiment of our insulated duct having an exterior coating of foil or film.

Figure 9 is a view similar to Figure 8 showing an insulated duct containing a further embodiment of our invention in which there is an interior lining of foil or film and an exterior coating of foil or film.

Figure 10 is a longitudinal sectional view similar to Figure 4 showing another embodiment of our insulated duct in the process of manufacture with apparatus employing a tapered instead of a collapsible mandrel.

Figure 11 is a perspective view similar to Figure 8 showing an insulated duct having a square instead of a circular cross-sectional perimeter.

Figure 12 is a perspective view with parts cut away of a joint in a conduit formed of a plurality of sections of our insulated duct having a rectangular cross-sectional shape.

Figure 13 is a fragmentary sectional view drawn on an enlarged scale viewed along the line 13—13 of Figure 12.

More particularly referring now to the drawings, molten glass is fed to an appropriately heated bushing 10, as shown in Figure 1, from a molten glass tank (not shown). Primary glass fibers 12 are drawn from a plurality of orifices positioned at the bottom of bushing 10 by drawing rolls 14. The rotation of the attenuating rolls 14 is of a relatively low speed in order to form "primary fibers" having diameters ranging between two hundred fifty and six hundred microns. These primary fibers are passed through fiber guides 16 which serve to separate the fibers longitudinally and maintain them substantially in a transverse plane. As the fibers emerge from the fiber guides 16 thy are subjected to a high-temperature, high-velocity blast from a hot gaseous blast device 18. This device is known to the art and comprises generally a gas heater for generating and delivering gases at high temperature and at high velocity through a plurality of nozzles. The temperature of the gases is such as to melt the primary fibers and the velocity of the gases is high enough to produce ultrafine secondary fibers 20. The velocity of the blast and the temperature of the hot gases are so controlled that the average diameter of the ultrafine fibers will not be greater than ten microns. It is to be understood, of course, that many individual fibers will have thicknesses of less than a micron and that many individual fibers may be as thick as fourteen microns. The average fiber diameter, however, is maintained at not greater than ten microns by governing the temperature of the hot gases and the velocity of the gas streams encountering the primary fibers emerging from the fiber guides 16.

We have found that an average fiber diameter of four microns gives the most advantageous results. If the average diameter of the glass fibers exceeds ten microns, the glass fibers will be too stiff and so many will break under molding that the inherent resiliency and dimensional stability which is a hallmark and badge of our improved insulated duct will not be achieved. It appears, further, that if the glass fibers have an average diameter of more than ten microns they will tend to orient themselves longitudinally of the forming conveyor. As a consequence of this, the random distribution of fibers which we achieve and which is desirable does not occur, and the improved results and remarkable properties of our improved insulated duct are not achieved. The fiber diameter is critical and an average diameter of not more than ten microns must be maintained to produce our improved insulated duct. The fineness of the fibers does not appear to have any adverse effects and we may make the glass fibers as fine as we like. There is a slight tendency, however, if the fibers are made too fine, to lose some of their spring strength and hence resiliency so that the finished insulated duct can be deflected under smaller forces than if the fibers are in the vicinity of four microns. It wil be understood, further, by those skilled in the art, that to form fibers of an average diameter of less than one and one-half microns requires a very high-velocity air blast and a high temperature. Since this is not necessary and costs money to produce, it is uneconomical to make the fibers too fine. We have found that the average optimum fiber diameter is about four microns and that advantageous results accrue up to the vicinity of an average fiber diameter of ten microns.

The fibers stream in the blast (it being understood that the conveyor is covered by a hood, not shown) and fall to the surface of a forming conveyor 22 which may conveniently take the form of an endless belt of foraminous metal or fabric or the like positioned upon the rollers 24 and 26 one or both of which may be power-driven. A vacuum box 28 which is maintained under subatmospheric pressure through an exhaust pump taking suction through pipe 29 is positioned below the foraminous belt to held the mat of fibers upon the belt. While the ultrafine glass fibers are being formed by the hot air blast, they are sprayed concurrently with a binding material from a plurality of spray guns 30. The spraying step coats the glass fibers with a discontinuous coating of binding material. We have found that any one of a number of heat-reactive plastics or combinations of these is appropriate for use as a binder in our process and in our insulated duct. Such materials as phenol condensation products, melamine resins, urea-formaldehyde resins, urea-melamine resins, vinyl chloride acetate resins, or the like, may be advantageously employed. The rate of flow of the binder from the spray nozzles 30 must be carefully adjusted. We have found that the weight of the binder with respect to the weight of the finished product should lie between fifteen percent and thirty-five percent. Otherwise stated, the binder must be used to an extent of between about seventeen percent to about fifty-five percent by weight, based on the weight of the glass filaments. If less than fifteen percent of binder, based on the weight of the finished insulated duct, is employed, the insulated duct is too flabby and loses its elasticity and dimensional stability. For example, instead of retaining its circular cross-sectional shape in the case of a circular duct under an applied force such as might be encountered in use, the cross-sectional shape will become more in the nature of an ellipse. Furthermore, the insulated duct will exhibit a tendency to delaminate which apparently contributes to the loss of circumferential elasticity. If, on the other hand, more than thirty-five percent, based on the weight of the finished insulated duct, of binder is employed, the finished duct will become boardy and stiff and will lose its inherent circumferential resiliency. When this occurs, if the duct, for example, is stepped on, it will crack or break and not resume its original cross-sectional shape. Our insulated duct may be deformed by pressure and will spring back to its original and desired cross-sectional shape when the pressure is released.

The turbulence of the air blast is such that, together with the fineness of the fibers, a considerable percentage of them will lie in various directions. Otherwise stated, the fiber orientation in the mat upon the forming conveyor 22 will be random. If the average fiber diameter exceeds the ten microns, the orientation appears to be generally longitudinally of the conveyor for the most part. Stated otherwise, if the average fiber diameter exceeds ten microns, the orientation of the fibers of the mat upon the forming conveyor will be less random and an average small percentage of the fibers will lie generally perpendicular to the surface of the belt and transverse thereto. The random orientation of the fibers appears to be critical, and this in turn in part is a function of the fiber diameter.

The mat formed of the secondary fibers in combination with the thermo-setting binder is then sheared by shears 32. The mat is then conveyed by delivery conveyor 34, which is operated at the speed of the forming conveyor 22, to a second conveyor 36, which is operated at the speed of the winder, which is indicated generally by the reference numeral 38. The winder comprises an endless belt 40 which is driven from a driving roll 42 around idler rollers 44, 46, 48 and 50. Roller 52 is the mandrel upon which the mat is wound upon itself while in "green" or uncured form. Roller 54 is a tensioning roller adapted to maintain a predetermined tension upon the cylinder of uncured mat being wound upon the mandrel 52. The mandrel 52 in the form shown in Figures 3, 4 and 5 comprises an upper member 51 pivoted to a lower member 53 around a longitudinal pin 55. A tapered, longitudinally extending member 57 is adapted to coact with members 51 and 53 to form the roller portion of the mandrel. A pair of end members 59 adapted to be fastened to the roller portion by means of bolts 61 complete the mandrel. Each end member is formed with a trunnion 63 adapted to be carried by the carrying arms 56 of the winder.

Where the insulated duct is formed of an interior surface of foil 100, as shown in Figure 6, this foil is first wound upon the roller portion of the mandrel before the green mat section is wound around it.

If no lining of foil is first employed, the mandrel 52 may be perforated as shown in Figure 7 and the green mat cured by passing heated air through the interior 70 of the mandrel 52 and out through the perforations 71 through the uncured rolled-up mat 60 and out through the perforations 64 of the mold 62.

As can readily be seen by reference to Figure 10, if desired the mandrel 52 may be tapered and provided with perforations in case no liner is to be wound thereon, or imperforate in event a liner is used. The taper may be quite small, as for example, one-sixteenth of an inch to every six feet of length. In the embodiment shown in Figure 10, the wound-up mat 60 is first covered with a layer of muslin 65 before being placed in the mold 62. This muslin may be four-ounce material, for example, and is quite porous. It becomes bonded to the sticky binder and is cured with it. It does not impose sufficient resistance to the flow of the hot air to preclude curing the wound-up mat within a reasonably short time. The curing in Figure 10 takes place by closing the ends of the mandrel 52 with closures 66 and 67. The closure 67 is provided with a pipe 69 into which heated air from any suitable source is passed. The hot air passes outwardly through the openings 71 in the mandrel 52, through the wound-up mat 60, through the muslin 65 and through the openings 64 to the atmosphere, curing the wound-up mat and forming a duct. The closure members 66 and 67 are then removed, the mold 62 opened and the duct slid off longitudinally of the mandrel. The taper in the mandrel permits this separation to take place without difficulty.

The mold volume with relation to the volume of material placed in the mold is carefully controlled in order to give the proper density to the finished product. We have found that the density of the walls of our insulated duct must lie between two pounds per cubic foot and five pounds per cubic foot. If the density is less than two pounds per cubic foot the material is too flabby and does not have sufficient resiliency and elasticity to spring back to its original form when deformed under external pressure, and accordingly a salient feature of our invention and one which enables the duct to be used is lost. It will be understood, of course, that any reduction in the cross-sectional area of the interior of the duct will destroy its usefulness as a conduit in a hot-air or air-conditioning system. If the density exceeds five pounds per cubic foot, the material becomes heavy; flexibility, which is one of the advantages of our duct, is lost; and the duct becomes subject to delamination and breakage. The optimum density is in the vicinity of three pounds per cubic foot. At this density our duct has superior elasticity and all the advantages of our improved insulated duct.

In the form of the invention shown in Figures 3, 4, 5 and 6, hot gases cannot pass through the interior of the mandrel because of the presence of the lining foil 100. The green ducts on the mandrels are placed in a chamber 68 which is supplied with hot gases from a source 69. The curing time is considerably increased over that when passing hot gases through the green material, as shown in Figure 10. In the latter case, the hot gases not only set the resin but drive off resulting moisture and thus hasten the cure. In the form of the invention shown in Figure 4, for a duct having a four-inch interior diameter and employing phenol formaldehyde as a binder, about five minutes with the hot gas at 450° F. completes the cure where the wall thickness of the duct was one inch. In the hot chamber shown in Figure 1, approximately twenty minutes are necessary to complete a cure.

To reduce the curing time, the exterior of the mold 62 in Figure 4 may, if desired, be provided with perforations 64. This permits some lateral migration of hot gases to occur from the edges of the wound-up duct material and permits moisture and vapors driven off during the curing process to escape.

After the insulated duct is cured it is allowed to cool and then removed from the mold still positioned on the mandrel. The mold may be of any appropriate design so the exterior shell may be removed. In the case of the tapered mandrel shown in Figure 10, the duct is removed axially of the mandrel, which is permitted, as described above, owing to the taper. In the case of the collapsible mandrel shown in Figures 3, 4 and 5, the tapered key member 57 is first removed so that the upper and lower sections 51 and 53 of the mandrel 52 may move to the position shown in Figure 5, when, with the parts in this position, the mandrel can be conveniently removed from the completed insulated duct, or, stated differently, the duct can be conveniently removed from the mandrel.

In the form of the invention shown in Figure 6, the interior lining 100 was formed of foil, such as aluminum foil or the like, being wrapped about the mandrel before the mat was wound about the mandrel. If desired, the lining 100 may be a deposited film of a solution of a resinous material which can be sprayed to coat the interior of the duct. The interior lining thus deposited will form a film which reduces the resistance to flow of the heated or cooled air through the duct and at the same time provides a vapor barrier which prevents the loss of heated or cooled air through the comparatively porous walls of the duct. Any appropriate material to form a film may be employed. A thin film of metal can be deposited from a metallizing gun such as known to the art.

The interior film is more expeditiously formed by the metal foil, as pointed out above. If we desire to provide an exterior vapor barrier, this can be done quite simply by applying an exterior film through spraying, painting, rolling, or otherwise. The finished ducts, for example, may be rolled across a molten asphaltic or bituminous material to seal the exterior thereof, which is then allowed to harden and thus provide a vapor barrier. The bituminous or asphaltic material, further, may be covered by a muslin wrapper or jacket while in heated condition. Alternatively, metal foil may be wrapped around the exterior of the completed insulated duct. Figure 8 shows an exterior coating of foil or film 102. In Figure 9 we have shown an insulated duct containing both an interior lining of foil or film 100 and an exterior covering of foil or film 102. The exterior coating would be employed advantageously for use in ducts for perimeter heating.

It is to be understood that any desirable cross-sectional shape may be employed for the mandrel upon which the mats are wound. In Figure 11, for example, we have shown a duct having a hollow square cross-sectional shape, and in Figure 12 we have shown a duct having a hollow rectangular cross-sectional shape. The duct in Figure 11 is provided with an exterior foil or film 102, while the duct in Figure 12 is provided with an interior foil or film 100.

The physical advantages of our improved insulated duct can be appreciated readily by those skilled in the art. The material is comparatively light, having a density between two pounds per cubic foot and five pounds per cubic foot. This makes for ease in handling so that installations involving insulated ducts can be readily made with a minimum of labor. The duct material can be cut quite readily with a penknife so that mitered and other joints can be readily made.

The thermal properties of our insulated duct, however, are remarkable. In the following table there is listed the density, thermal conductivity, thermal resistivity, and thermal resistivity per pound of density of the various thermal insulations of the prior art which can be applied to pipes or ducts:

|  | Density (pounds per cubic foot) | (k) Thermal conductivity at 100° F. Mean | (1/k) Thermal resistivity | Thermal resistivity per pound of density |
|---|---|---|---|---|
| Diatomaceous Silica type | 27 | .63 | 1.59 | .059 |
| Laminated Asbestos Felt | 34 | .39 | 2.56 | .075 |
| Corrugated Asbestos type | 12 | .57 | 1.75 | .146 |
| 85% Magnesia, 15% Asbestos | 13 | .39 | 2.56 | .197 |
| Mineral Wool | 13 | .40 | 2.50 | .192 |
| Asbestos Reinforced Calcium Silicate | 11 | .41 | 2.44 | .222 |
| Glass Wool-resin Semi-cylinders | 6 | .25 | 4.00 | .667 |
| Stephens et al | 3 | .24 | 4.17 | 1.39 |

In the above table, the corrugated asbestos was four-ply and is a well-known covering composed of alternate layers of corrugated and plain asbestos paper. It will be noted that the thermal insulation of our insulated duct has a higher thermal resistivity than any of the well-known thermal insulation materials of the prior art. Thermal resistivity is the reciprocal of thermal conductivity, known to the art as "k." "k" is defined as the time rate of heat flow through a homogeneous material under steady conditions through unit area per unit temperature gradient in the direction perpendicular to the area. Its value is expressed in B. t. u. per (hour) (square foot) (Fahrenheit degrees per inch of thickness). Materials are considered homogeneous when the value of $k$ is not affected by variation in thickness or size of sample within the range normally used in construction. While it was anticipated that our material would have a high thermal resistivity, it could not be expected that its resistivity per pound of density would be more than twice that of other glass wool plastic-bonded materials.

Thus far we have described our improved insulated duct and a method of making the same, assuming a duct of limited length, which we will consider a section of an elongated conduit composed of a plurality of sections of duct. We have found advantageously that a section of our insulated duct may be six feet in length. Duct sections can be secured to each other in any appropriate manner. Ends formed in a mold such as shown in Figure 10, for example, may be butted against each other and secured in abutting position by wrapping a wide band of friction tape around the abutting sections. If the vapor barrier is external of the insulation, an adequate joint is made. If, however, the vapor barrier is interiorly disposed, as shown in Figure 12, this method of securing one section to another is not adequate.

Advantageously we may compress one end of a section, say to one-half its thickness, molding it in this position in a special mold by heat and pressure so that the outside wall layers are compressed inwardly. We can also mold the other end of each section in a similar manner so that the inside wall layers are deformed outwardly. Referring to Figure 13, for example, the end 111 of the left-hand section has had its wall thickness reduced from the outside toward the interior of the duct. The coacting section 113 of the right-hand duct section has had its wall thickness reduced from the inside in an outwardly direction. This permits the telescoping of adjacent ends of the sections to form a conduit of any desired length. While we have shown interfitting stepped ends for adjacent sections of an elongated duct, it is to be understood that the interfitting ends may be tapered or may be joined in any other appropriate manner.

It will be seen that we have accomplished the objects of our invention. We have provided an insulated duct formed of heat-insulating material having a very high heat resistance to heat flow in proportion to its weight. We have provided an insulated duct formed of insulating material having sufficient elasticity to retain its dimensional stability under considerable external stress and in which the dimensional stability comes chiefly from the insulating material itself rather than from a sheet metal duct or the like to which insulating material has been applied, as is customary in the art. We have provided an improved article of manufacture comprised of insulating material having the form of a duct provided with an interior or exterior foil or film which is ideally adapted to conduct heated or cooled air, if desired, for heating or air-conditioning purposes. Our insulated duct, due to its elasticity and springiness, will withstand considerable abuse and yet retain its dimensional stability. It can be dropped and stepped on without adverse effect. Due to its lightness, it can be handled and installed with ease and with speed and with a minimum expediture of labor, which is an outstanding economic advantage in these days of increased labor costs. Our insulated duct provides thermal insulation which has a very high resistance to heat flow therethrough in proportion to its weight. The flexibility of our insulated duct is such that it can be readily deformed to provide a conduit between openings which are not precisely in alignment without suffering a marked loss in cross-sectional area. Our telescoping end portions enable us to form an elongated duct from a plurality of sections in a simple, convenient and expeditious manner.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. An insulated duct comprising a hollow conduit having a wall formed of glass fibers of an average diameter of less than ten microns bonded with a binder in an amount between fifteen percent and thirty-five percent by weight of the wall material, said wall material having a density of between two pounds and five pounds per cubic foot.

2. An insulated duct comprising a hollow conduit having a wall formed of glass fibers of an average diameter of less than ten microns bonded with a heat-reactive resin in an amount between seventeen percent and fifty-five percent by weight, based on the weight of the glass fibers, said wall material having a density of between two pounds and five pounds per cubic foot.

3. An insulated duct comprising a hollow conduit having a wall formed of glass fibers of an average diameter of about four microns bonded with a heat-reactive resin in an amount between seventeen percent and fifty-five percent by weight, based on the weight of the glass fibers, said wall material having a density of between two pounds and five pounds per cubic foot.

4. An insulated duct comprising a hollow conduit having a wall formed of glass fibers of an average diameter of less than ten microns bonded with a heat-reactive resin in an amount of about thirty-three percent by weight, based on the weight of the glass fibers, said wall material having a density of between two pounds and five pounds per cubic foot.

5. An insulated duct comprising a hollow conduit having a wall formed of glass fibers of an average diameter of less than ten microns bonded with a heat-reactive resin in an amount between fifteen percent and thirty-five percent by weight, based on the weight of the wall material, said wall material having a density of about three pounds per cubic foot and having a $k$ value of not more than .25 at 100° F. mean temperature said $k$ value being the time rate of heat flow through a unit area of said wall material per unit temperature gradient in a direction perpendicular to said area.

6. An insulated duct comprising a hollow conduit having a wall formed of glass fibers of an average diameter of less than ten microns bonded with a binder in an amount between 17 percent and 55 percent by weight, based on the weight of the glass fibers, said wall material having a density of between 2 pounds and 5 pounds per cubic foot, said wall being provided with a vapor barrier.

7. An insulated duct as in claim 6 in which said vapor barrier comprises a lining carried by the interior of the conduit.

8. An insulated duct as in claim 6 in which said vapor barrier comprises a covering carried by the exterior of the conduit.

9. An insulated duct as in claim 6 in which said vapor barrier comprises a tube of thin material around which said wall material is disposed.

10. An insulated duct as in claim 6 in which said vapor barrier comprises a film covering the outside of said conduit wall.

11. An insulated duct comprising a plurality of hollow conduit sections, each having a wall formed of glass fibers of an average diameter of less than ten microns bonded with a heat reactive resin in an amount between 17 percent and 55 percent by weight, based on the weight of the glass fibers, said wall material having a density of between 2 pounds and 5 pounds per cubic foot, adjacent conduit sections being formed with telescoped ends.

12. An insulated duct comprising a plurality of hollow conduit sections each having a wall formed of glass fibers of an average diameter of less than ten microns bonded with a heat reactive resin in an amount between 17 percent and 55 percent by weight, based on the weight of the glass fibers, said wall material having a density of between 2 pounds and 5 pounds per cubic foot, adjacent conduit sections being formed with stepped nested ends.

References Cited in the file of this patent

UNITED STATES PATENTS

| | | |
|---|---|---|
| 1,602,579 | Ives | Oct. 12, 1926 |
| 1,864,923 | Mesmer | June 28, 1932 |
| 2,101,921 | Shaver | Dec. 14, 1937 |
| 2,331,146 | Slayter | Oct. 5, 1943 |
| 2,377,317 | Blume | June 5, 1945 |
| 2,383,733 | Parker | Aug. 28, 1945 |
| 2,405,330 | Ryder | Aug. 6, 1946 |
| 2,467,999 | Stephens | Aug. 19, 1949 |
| 2,528,091 | Slayter | Oct. 31, 1950 |
| 2,589,008 | Lannau | Mar. 11, 1952 |
| 2,614,058 | Francis | Oct. 14, 1952 |
| 2,643,700 | Havens | June 30, 1953 |
| 2,653,887 | Slayter | Sept. 29, 1953 |